United States Patent [19]
Persoon et al.

[11] Patent Number: 5,117,386
[45] Date of Patent: May 26, 1992

[54] FULL ADDER CIRCUIT

[75] Inventors: Eric H. J. Persoon; Christian J. B. O. E. Vandenbulcke, both of Eindhoven, Netherlands

[73] Assignee: U.S. Philips Corporation, New York, N.Y.

[21] Appl. No.: 576,132

[22] Filed: Aug. 28, 1990

Related U.S. Application Data

[63] Continuation of Ser. No. 661,526, Oct. 15, 1984, abandoned.

[30] Foreign Application Priority Data

Apr. 24, 1984 [NL] Netherlands ................. 8401308

[51] Int. Cl.$^5$ ............................................. G06F 7/50
[52] U.S. Cl. ................................. 364/787; 364/788
[58] Field of Search ........................ 364/784–788, 364/768

[56] References Cited

U.S. PATENT DOCUMENTS

| | | | |
|---|---|---|---|
| 3,100,835 | 8/1963 | Bedrij | 364/788 |
| 3,316,393 | 4/1967 | Ruthazer | 364/788 |
| 3,553,446 | 1/1971 | Kruy | 364/788 |
| 3,906,211 | 9/1975 | Glaser | 364/786 |
| 4,573,137 | 2/1986 | Ohhashi | 364/788 |
| 4,675,838 | 6/1987 | Mazin et al. | 364/788 |

FOREIGN PATENT DOCUMENTS 0964375  3/1975  Canada ................... 364/788

OTHER PUBLICATIONS

O. J. Bedrij, Carry-Select Adder, Jun. 1962, pp. 340 to 346.

Primary Examiner—Tan V. Mai
Attorney, Agent, or Firm—Bernard Franzblau

[57] ABSTRACT

To generate quickly the several carry signals in a full adder circuit (for example a 40-bit circuit), the circuit is divided into a plurality of sub-circuits of a first type, in which complementary imaginary carry signals are generated parallel to each other. Carry look-ahead circuits are of a dual construction, each first carry look-ahead circuit receiving a logic "0" and each second carry look-ahead circuit receiving a login "1". So the generated imaginary carry signals are complementary, from which the carry signal proper is selected with the aid of a multiplex switch. The multiplex switch is controlled by the carry signal generated in a preceding sub-circuit of the first type. Since a multiplex switch operates faster than 3-bit or 4-bit wide carry look-ahead circuits, which operate in parallel in groups, the carry signals are consequently generated faster.

6 Claims, 2 Drawing Sheets

FULL ADDER CIRCUIT

This is a continuation of application Ser. No. 661,526, filed Oct. 15, 1984, now abandoned.

BACKGROUND OF THE INVENTION

1. Field of the Invention

The invention relates to a full adder circuit for adding two n-bit binary numbers, i.e. to a full adder circuit divided into a plurality of cascaded sub-circuits of a first type having a plurality of bit inputs for receiving groups of bit signals having a significance progressing from m to k wherein $m < k \leq n$. The sub-circuit of a first type comprises two sub-circuits of a second type and a selection circuit, first and second sub-circuits of the second type, respectively receiving the respective logic values "0" and "1" at a carry signal input and generating at a carry signal output an imaginary carry signal having a significance $k+1$. These carry signal outputs are connected to inputs of the selection circuit, a further input of which is connected to an output of a preceding sub-circuit of the first type or a sub-circuit of the second type which is arranged in cascade with the sub-circuit of the first type, at which output a carry signal having a first significance (m) is generated for selecting, with the aid of the selection circuit, a carry signal having a higher significance $(k+1)$ from the generated imaginary carry signals and for applying the selected carry signal to a carry signal output of the sub-circuit of the first type.

2. Description of the Prior Art

Such a logic circuit is described in a publication disclosed during the International Solid State Conference, Feb. 22nd 1984, pages 90, 91, 324 "A CMOS Floating Point Multiplier" by Masaru Kya. The 24 bit-full adder circuit used in the multiplier circuit comprises, arranged in cascade, sub-circuits of a first type which each comprise two parallel-operating (4, 5 or 6 bits) full adder sub-circuits of a second type, respective first and second sub-circuits of the second type receiving a logic signal "0" and "1", respectively at their carry signal inputs. The two parallel-operating sub-circuits of the second type consequently generate complementary groups of sum signals and complementary imaginary carry signals. A first real carry signal is generated by a first full adder sub-circuit of the second type from the group of least significant bits of the two numbers to be added. The first real carry signal is applied to a multiplexing circuit of a sub-circuit of the first type, which is arranged in cascade with the first full adder sub-circuit of the second type by means of which a group of sum signals is selected from the complementary groups of sum signals applied to the multiplexing circuit. In addition, the sub-circuit of the first type comprises selection means to which the complementary imaginary carry signals are applied and also the first real carry signal. With the last-mentioned carry signal the correct carry signal of a higher significance is selected from the two imaginary carry signals, which in its turn is utilized as the "first real" transfer signal for a subsequent sub-circuit of the first type, arranged in cascade with the sub-circuit of the first type. Using such a full adder circuit it is possible to add together large binary numbers (for example 24-bit numbers) in a comparatively short time.

Due to the use of the dual full adder sub-circuits of the second type and the multiplexing circuit connected thereto, the circuit has the disadvantage that a comparatively large semiconductor surface is required. Moreover, the time necessary for adding together binary numbers of, for example, more than 32 to 40 bits, will increase because of the increasing number of series-arranged selection means (gate circuits) required therefor.

SUMMARY OF THE INVENTION

An object of the invention is to provide a full adder circuit in which the required semiconductor surface is less than in the prior art circuit and in which, in the same short time, or in an even shorter time, binary numbers (having for example 30 to 40 bits) can be added together.

A full adder circuit according to the invention is therefore characterized in that the sub-circuits of the second type are carry look-ahead circuits, outputs of which are connected to the carry signal input of the selection circuit whose further input is connected to a carry signal input of a single full adder for adding together two bits of the significance m. Thus, for each group of bits a single full adder generates a single correct sum so that each sub-circuit needs only one full adder. In contrast, the prior art needs two adders to generate two conditional sums for each sub-circuit.

A preferred embodiment of a full adder circuit according to the invention is characterized in that a carry look-ahead circuit includes at least two look-ahead units, the consecutive look-ahead units receiving significance-sequential sub-groups (m to 1, 1 to k) from a group of bit signals (wherein $m < 1 \leq k$) for generating imaginary carry signals having a progressing significance, the selection means including a selection circuit for every two look-ahead units producing imaginary carry signals with the same significance. Carry signal inputs of said selection circuit are connected to the outputs of the last-mentioned two look-ahead units and an output of said selection circuit is connected to an input of a full adder for adding together two bits having the same associated significance. A carry signal having a first significance generated in a preceding sub-circuit of the first type or in a sub-circuit of the second type is applied to a control input of each selection circuit in a sub-circuit of the first type for selecting a carry signal from the two imaginary carry signals applied to the selection circuit.

BRIEF DESCRIPTION OF THE DRAWINGS

The invention will now be described in greater detail with reference to the examples illustrated in the accompanying drawing, in which drawing.

DESCRIPTION OF THE PREFERRED EMBODIMENTS

Figure 1:
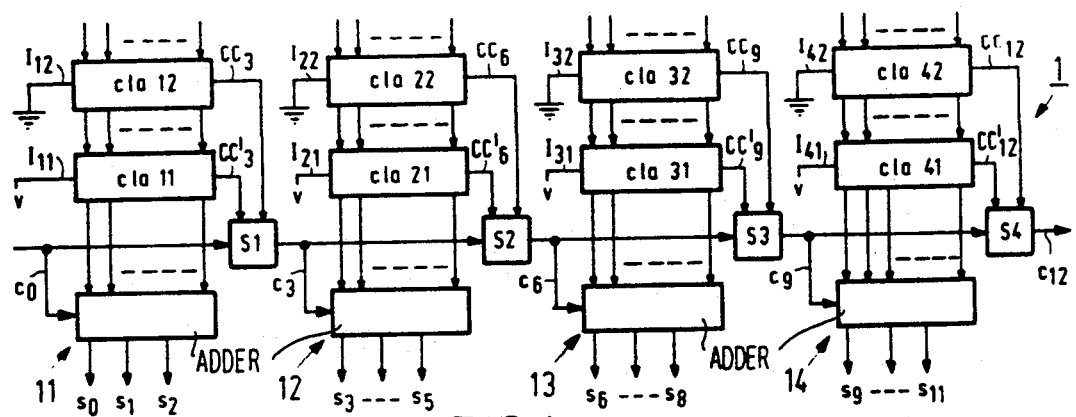
FIG. 1 shows a block diagram of a full adder circuit according to the invention.

FIG. 1 shows a block diagram of a 12-bit full adder circuit 1 according to the invention. The circuit 1 comprises four sub-circuits of the first type arranged in cascade. The sub-circuits of the first type each comprise two sub-circuits of the second type cla 11, 12; cla 21, 22; cla 31, 32 and cla 41, 42, a selection circuit S1, S2, S3, S4 and each three-bit full adders 11, 12, 13 and 14. In this example groups of bit signals $a_0$, $a_1$, $a_2$; $b_0$, $b_1$, $b_2$ ... $a_9$, $a_{10}$, $a_{11}$; $b_9$, $b_{10}$, $b_{11}$ are applied to the sub-circuits of the second type cla 11, 12, ... 41, 42 and to the full adders 11, 12, 13, 14 to determine the sum signals $s_0$, $s_1$, $s_2$, $s_3$ ... $s_9$, $s_{10}$, $s_{11}$ by the respective full adders 11, 12, 13, 14 and which consequently also respectively receive carry signals $C_0$, $C_3$, $C_6$, $C_9$. The carry signal $C_0$ is applied from the outside and is usually a logic "0", unless the full adder circuit 1 shown in FIG. 1 is arranged in cascade with a (similar) full adder circuit for adding together two binary numbers having a number of bits exceeding 12. The carry signals $C_3$, $C_6$ and $C_9$ (and $C_{12}$) are generated in the circuit 1. Of two numbers A and B to be added together, three bits $a_0$, $b_0$, $a_1$, $b_1$, $a_2$, $b_2$, whose significance progresses from 0 to 2, are applied to the three-bit full adder 11. The full adder 12 receives the three bits $a_3$, $b_3$ ... $a_5$, $b_5$ of the next higher significance of the numbers A and B and the full adder 13 receives the three bits $a_6$, $b_6$ ... $a_8$, $b_8$ etc of a next higher significance. From each pair of applied bits $a_i$, $b_i$ of the same significance an inverted AND-signal $\overline{a_i \cdot b_i}$ and an inverted OR-signal $\overline{a_i + b_i}$ are formed, with which in combination with a carry signal $C_j$ a sum signal $s_i$ and a carry signal $C_{i+1}$ of a higher significance are determined. The newly generated carry signal $C_{i+1}$ is used again, in combination with the inverted AND-signal and OR-signal $\overline{a_i \cdot b_i}$, $\overline{a_i + b_i}$ to determine a sum signal $s_{i+1}$ and a carry signal $C_{i+2}$. So as to avoid that for forming the sum signal $s_{11}$ (or $s_n$ when two n-bit numbers are added together) all the carry signals $C_i$ (i=0, ... 11; or i=0, ... n) must first be sequentially generated, carry look-ahead circuits cla 11, 12, 21, ... 41, 42 are added to the full adders 11, 12, 13, 14. To generate the imaginary carry signals $CC_3$ and $\overline{CC_3}$, the inputs $I_{11}$ and $I_{12}$, respectively receive a logic "0" level or a logic "1" level, respectively from respective look-ahead circuits cla 11 and cla 12. The look-ahead circuits cla 11, 12 both receive the inverted AND-signals and OR-signals $\overline{a_i \cdot b_i}$ and $\overline{a_i + b_i}$, the index i having the values 0, 1 and 2. The look-ahead circuits cla 11 and 12 generate imaginary carry signals $CC_3$ and $\overline{CC_3}$ which are applied to selection circuit S1 in the form of, for example, a transfergate or a conventional logic gate circuit. Applied to a control input of the selection circuit S1 is the incoming carry signals $C_0$ of significance 0, with which one of the imaginary carry signals $CC_3$ and $\overline{CC_3}$ is selected and applied as a look-ahead carry signal $C_3$ to the full adder circuit 12.

In this way the three-bit full adder 12 can already start generating sum signals $s_3$, $s_4$ before the sum signal $s_2$ and a carry signal have been formed via the preceding full adder 11. The look-ahead circuits cla 21 and 22 receive the inverted AND- and OR-signals $\overline{a_i \cdot b_i}$ and $\overline{a_i + b_i}$, the index i having the values 3, 4 and 5. The circuits cla 21 and 22 generate imaginary carry look-ahead signals $CC_6$ and $\overline{CC_6}$, a logic "0" or a logic "1" level, respectively being applied to the carry signal inputs $I_{21}$ and $I_{22}$, respectively of the respective look-ahead circuits cla 21 and cla 22. So the imaginary carry signals $CC_6$ and $\overline{CC_6}$ are generated simultaneously with the imaginary carry signals $CC_3$ and $\overline{CC_3}$. With the look-ahead carry signal $C_3$ which is chosen with the aid of the incoming carry signal $C_0$, the look-ahead carry signal $C_6$ of the higher significance (6) is selected with the aid of the selection circuit S2. The look-ahead carry signal $C_6$ is generated relative to the look-ahead carry signal $C_3$ already after one "gate delay" produced by one of the selection circuits S2. The look-ahead carry signal $C_6$ is applied to the three-bit full adder 13 and also to selection circuit S3, with which the look-ahead carry signal $C_9$ is chosen from two imaginary carry signals $CC_9$ and $\overline{CC_9}$, which are generated in a similar way as and simultaneously with the signals $CC_3$, $\overline{CC_3}$, $CC_6$ and $\overline{CC_6}$ by the circuits cla 31 and 32. Thus, after only one gate delay a look-ahead carry signal $C_9$ having significance 9 (selected via the selection circuit S3) will again be available.

Using the look-ahead carry signal $C_9$ the look-ahead carry signal $C_{12}$ is selected by means of the selection circuit S4 from the imaginary carry signals $CC_{12}$ and $\overline{CC_{12}}$ generated in the above-described way by the look-ahead circuits cla 41 and 42.

From the foregoing it will be obvious that the sum signals $s_0$, $s_1$, ... $s_{11}$ can be generated very quickly by the full adders 11, 12, 13 and 14, as the look-ahead carry signals $C_3$, $C_6$, $C_9$ required for the full adders 11, 12, 13, 14 are sequentially generated, always after a further gate delay. It will be obvious that the selection circuits S1, S2, S3, S4 used are always formed by a two-to-one multiplex circuit, that for each group of bits two look-ahead circuits are required and for each bit only one full adder is necessary, which results in an advantageous reduction of the semiconductor surface required for the full adder circuit according to the invention. For adding together binary numbers with more than 12 bits, it is only necessary to arrange two or more of the full adder circuits 1, shown in FIG. 1 in cascade.

Figure 2:
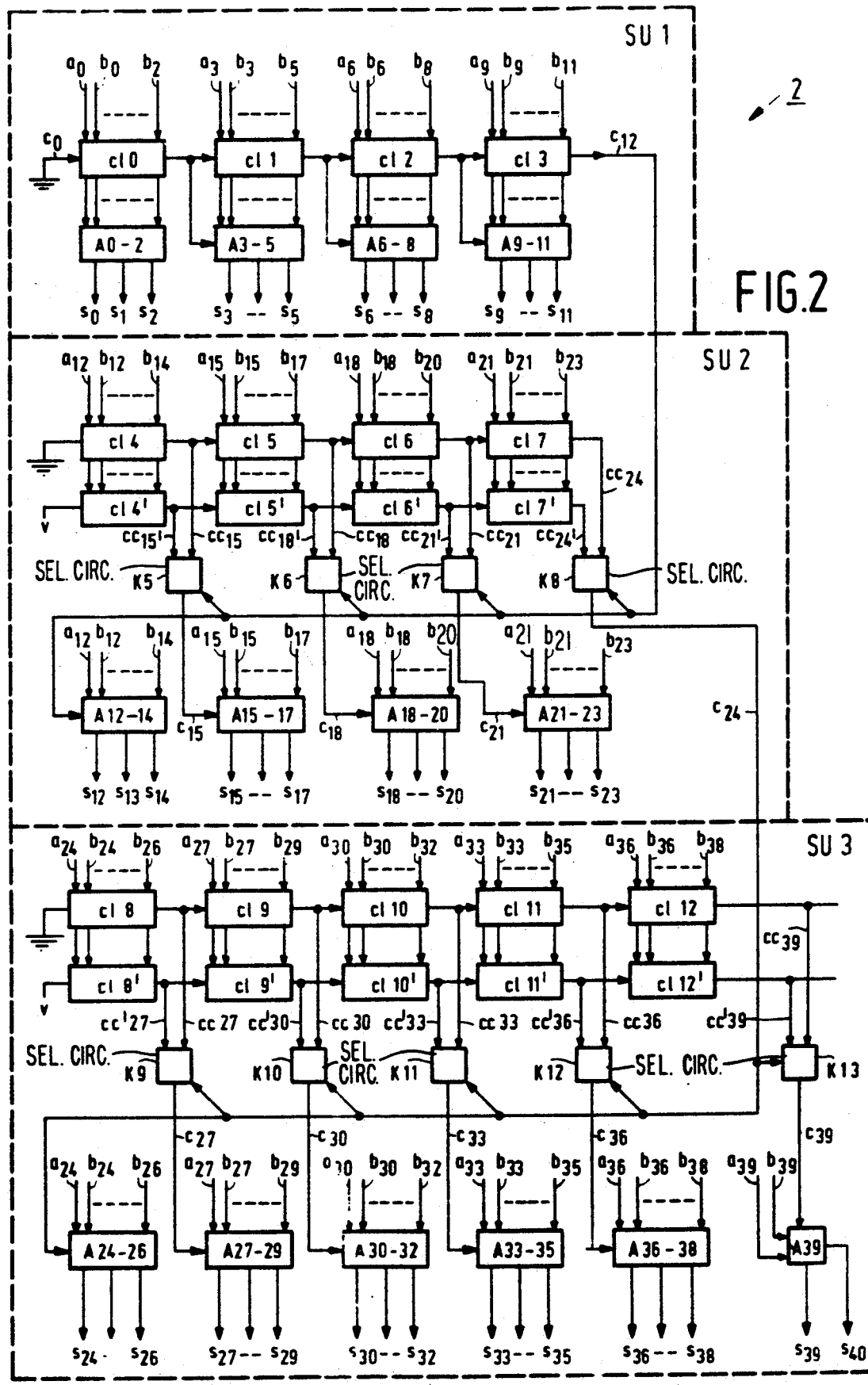
FIG. 2 shows a more detailed circuit diagram of a full adder circuit in a preferred embodiment according to the invention.

FIG. 2 shows an embodiment of a 40-bit full adder circuit 2 according to the invention. The full adder circuit 2 comprises three sub-circuits of the first type SU1, SU2, SU3. The first sub-circuit SU1 comprises a cascade arrangement of four carry look-ahead circuits cl 0, 1, 2, 3 which at their inputs receive from the group of bit signals $a_0$, $b_0$, $a_1$, $b_1$ ... $a_{11}$, $b_{11}$ applied to sub-circuit SU1 the respective sub-groups $a_0$, $b_0$, ... $b_2$; $a_3$, $b_3$ ... $b_5$; $a_6$, $b_6$ ... $b_8$; $a_9$, $b_9$, ... $b_{11}$. The four sub-groups of bit signals are also applied to four cascade arrangements of three-bit full adders A0-2, A3-5, A6-8, A9-11, respectively. At its carry signal input the carry look-ahead circuit cl 0 receives a carry signal $C_0$ which generally has the logic value "0". The sub-circuit of the first type SU1 is an adder circuit which is known per se and determines the sum signals $s_0$, $s_1$, $s_2$, ... $s_{11}$ and a carry signal $C_{12}$ from the received carrier signal and the received bit signals. The carry signal $C_{12}$ is applied to the carry signal input of a sub-circuit of the first type SU2.

The sub-circuit of the first type SU2 comprises a first sub-circuit of the second type cl 4, cl 5, cl 6, cl 7, a second sub-circuit of the second type cl 4', cl 5', cl 6', cl 7', a selection circuit K5, K6, K7, K8 and full adders A12-14, A15-17, A18-20, A21-23. Said sub-circuits of the second type are carry look-ahead circuits formed from a cascade arrangement of look-ahead sub-circuits cl 4, cl 5, cl 6, cl 7 and cl 4', cl 5', cl 6', cl 7', respectively. In addition to the above-mentioned carry signal $C_{12}$, the sub-circuit of the first type SU2 receives the groups of bit signals $a_{12}$, $a_{13}$, ... $a_{23}$ and $b_{12}$, $b_{13}$, ... $b_{23}$ with a significance increasing from 12 to 23, inclusive of the two binary numbers A and B. The group of bit signals is divided into sub-groups $a_{12}$, $b_{12}$, $a_{13}$, $b_{13}$, $a_{14}$, $b_{14}$; $a_{15}$, $b_{15}$, ... $b_{17}$; $a_{18}$, $b_{18}$, ... $b_{20}$; $a_{21}$, $b_{21}$, ... $b_{23}$ which are applied to the respective look-ahead sub-circuits cl 4 and cl 4'; cl 5 and cl 5'; cl 6 and cl 6'; cl 7 and cl 7' and to the respective full adders A12-14, A15-17, A18-20, A21-23. The carry signal inputs of the look-ahead sub-circuits cl 4 and cl 4', respectively receive the logic values "0" and "1", respectively. The look-ahead sub-circuits cl 4 and cl 4', respectively generate from the applied bit signals $a_{12}, b_{12}, \ldots b_{14}$ and from the respective said logic values "0" and "1" the respective imaginary carry signals $CC_{15}$ and $CC_{15'}$ with significance 15, which are applied respectively to the carry signal inputs of the look-ahead sub-circuit cl 5 and cl 5', respectively. In addition, the imaginary carry signals $CC_{15}$ and $CC_{15'}$ are applied to a selection circuit K5, which under the control of the carry signals $C_{12}$ selects a real carry signal $C_{15}$ from the imaginary carry signals $CC_{15}$ and $CC_{15'}$. The carry signal $C_{15}$ is applied to the carry signal input of the full adder A15. The full adder A12 receives the carry signal $C_{12}$ and forms therewith from the bit signals $a_{12}$ and $b_{12}$ in a manner known in itself the sum signal $s_{12}$ and an (internal) carry signal for full adder A13, which forms from the bit signal $a_{13}, b_{13}$ the sum signal $s_{13}$ and also an (internal) carry signal $C_{14}$ for adder A14, which produces the sum signal $s_{14}$. Likewise, the full adders A15-17 form the sum signals $s_{15}, s_{16}, s_{17}$ from the carry signal $C_{15}$ and the bit signals $a_{15}, b_{15} \ldots b_{17}$.

The look-ahead sub-circuits cl 5 and cl 5' do not only receive the imaginary carry signals $CC_{15}$ and $CC_{15'}$ but also the bit signals $a_{15}, b_{15}, \ldots b_{17}$ and from them two imaginary carry signals $CC_{18}$ and $CC_{18'}$ with significance 18. The imaginary carry signals $CC_{18}$ and $CC_{18'}$ are applied to a selection circuit K6 and to the signal carry inputs of the look-ahead sub-circuits cl 6 and cl 6'. Using the selection circuit K6 a carry signal $C_{18}$ is selected from the two imaginary carry signals $CC_{18}$ and $CC_{18'}$ under the control of the carry signal $C_{12}$, and is applied to the full adders A18-20. The full adders A18-20 produce the sum signals $s_{18}, s_{19}, s_{20}$ from the carry signal $C_{18}$ and the bit signals $a_{18}, b_{18}, \ldots b_{20}$.

The imaginary carry signals $CC_{18}$ and $CC_{18'}$ are applied to the look-ahead sub-circuits cl 6 and cl 6', which receive in addition the signals $a_{18}, b_{18}, \ldots b_{20}$ and produce the imaginary carry signals $CC_{21}$ and $CC_{21'}$ from the received signals. The imaginary signals $CC_{21}$ and $CC_{21'}$ are applied to a selection circuit K7, which selects under the control of the carry signal $C_{12}$ a carry signal $C_{21}$ and conveys it to the full adders A21-23. The full adders A21-23 form the sum signals $s_{21}, s_{22}$ and $s_{23}$ from the carry signal $C_{21}$ and the bit signals $a_{21}, b_{21}, \ldots b_{23}$. In addition, the imaginary carry signals $CC_{21}$ and $CC_{21'}$ are applied to the look-ahead sub-circuits cl 7 and cl 7', which further receive the bit signals $a_{21}, b_{21}, \ldots b_{23}$ and generate the imaginary carry signals $CC_{24}$ and $CC_{24'}$ from the signals applied. The imaginary carry signals $CC_{24}$ and $CC_{24'}$ are applied to the selection circuit K8 which under the control of the carry signal $C_{12}$ selects the carry signal $C_{24}$, which is applied to the subsequent sub-circuit of the first type SU3 (*inter alia* to the full adder A24 incorporated therein).

The sub-circuit of the first type SU3 comprises first and second sub-circuits of the second type cl 8 to cl 12 and cl 8' to cl 12', selection means in the form of selection circuits K9 to K13, and full adders A24 to A39. The sub-circuit of the first type SU3 is substantially identical to the sub-circuit of the first type SU2. Four look-ahead sub-circuits of the second type cl 4 to cl 7 and cl 4' to cl 7' are always arranged in cascade in the sub-circuit of the first type SU2. In the sub-circuit of the first type SU3 always five look-ahead sub-circuits of the second type cl 8 to cl 12 and cl 8' to cl 12' are arranged in series. The respective carry signal inputs of look-ahead sub-circuits of the second type cl 8 and cl 8' receive a logic "0" and a logic "1" signal, respectively. In addition, the look-ahead sub-circuits cl 8 and cl 8' receive the bit signals $a_{24}, b_{24}, \ldots b_{26}$. From the signals received the look-ahead sub-circuits cl 8 and cl 8' generate imaginary carry signals $CC_{27}$ and $CC_{27'}$, which are applied to both the selection circuit K9 and the look-ahead sub-circuits cl 9 and cl 9'. The latter circuits generate the imaginary carry signals $CC_{30}$ and $CC_{30'}$ from the bit signals $a_{27}, b_{27}, \ldots b_{29}$ and said signals $CC_{27}$ and $CC_{27'}$. The imaginary carry signals $CC_{30}$ and $CC_{30'}$ are applied to the selection circuit K10 and also to the subsequent look-ahead sub-circuits cl 10 and cl 10'. As will be obvious from the foregoing, the look-ahead sub-circuits cl 10 and cl 10' and the subsequent, similar circuits cl 11 and cl 11', cl 12 and cl 12' generate the respective imaginary carry signals $CC_{33}$ and $CC_{33'}$, $CC_{36}$ and $CC_{36'}$ and $CC_{39}$ and $CC_{39'}$, which are applied to the associated selection switches K11, K12 and K13, respectively. Using the carry signal $C_{24}$, which controls the selection circuits K9 to K13, the desired carry signals $C_{27}, C_{30}, C_{33}, C_{36}$ and $C_{39}$ are selected from said imaginary carry signals $CC_{27}, CC_{27'} \ldots CC_{39'}$ and are applied to the full adders A24, A27, A30, A33, A36 and A39, respectively, which causes the sum signals $s_{24}, s_{25}, \ldots s_{39}$ to be generated.

Adding together two binary numbers can be effected very quickly with the above-described 40-bit full adder circuit 2. A look-ahead sub-circuit cl i ($0 \leq i \leq 12$) has, for example, a time delay of $\tau_c \approx 17$ nsec. (time elapsed between the instant at which the input signals are presented and the carry signal is supplied). The selection circuits $K_j$ ($5 \leq j \leq 13$) have a time delay $\tau_s \approx 12$ nsec., while a three-bit full adder (for example A24-26) has a time delay of $\tau_a \approx 33$ nsec. From the different time delays it can be derived that the carry signal $C_{12}$ is available after $4 \times \tau_c = 68$ nsec., that the carry signals $C_{15}, C_{18}, C_{21}$ and $C_{24}$ are simultaneously available after $4 \times \tau_c + \tau_s = 80$ nsec., that the carry signals $C_{27}, C_{30}, C_{33}, C_{36}$ and $C_{39}$ are simultaneously available after $4 \times \tau_c + 2 \times \tau_s = 92$ nsec., and that the sum signal $S_{38}$ is available as the last sum signal after $4 \times \tau_c + 2 \times \tau_s + \tau_a = 125$ nsec. It should be noted that the imaginary signals $CC_{24}, CC_{24'}$ and $CC_{39}, CC_{39'}$ are only available after $4 \times \tau_c = 68$ nsec. and $5 \times \tau_c = 85$ nsec., respectively, which (in practice) must preferably be substantially at the instants at which the respective controlling carry signals $C_{12}$ and $C_{24}$ become available, (for $C_{12}$: $4 \times \tau_c = 68$ nsec., for $C_{24}$: $4 \times \tau_c \tau_s = 80$ nsec.).

Figure 3:
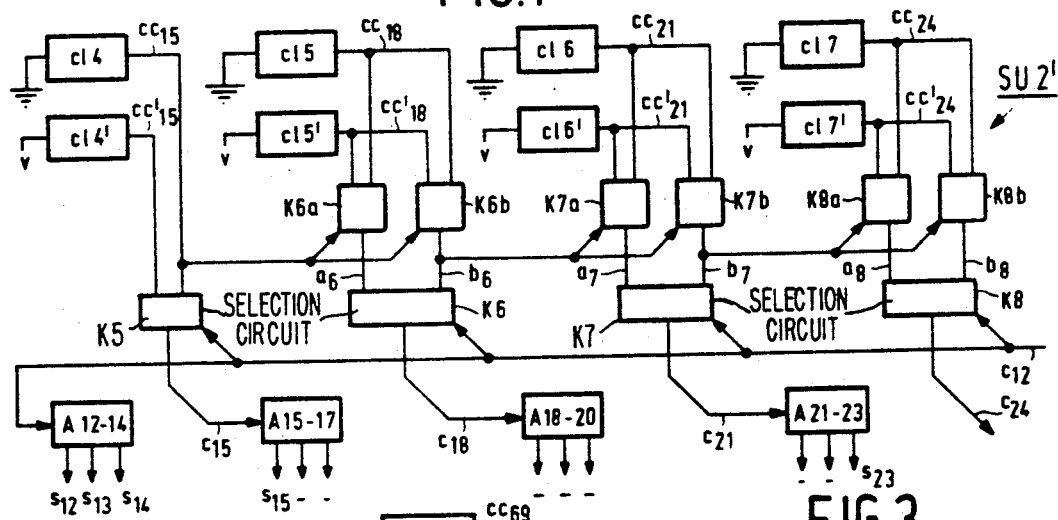
FIG. 3 shows a circuit diagram of a further embodiment of a portion of the full adder circuit according to the invention.

FIG. 3 shows a preferred embodiment of a sub-circuit of the first type SU2' of an adder circuit according to the invention, which can be substituted for the sub-circuit of the first type SU2 of FIG. 2, without further measures. Corresponding components in FIGS. 2 and 3, have been given the same reference numerals. For the sake of clarity, FIG. 3 does not show the bit signals to be applied and the inputs for those bit signals. In the sub-circuit SU2' imaginary carry signals $CC_i$ and $CC_{i'}$ (i=15, 18, 21, 24) are generated simultaneously and are consequently all available after 17 nsec. The imaginary carry signals $CC_{15}$ and $CC_{15'}$ are applied to the selection circuit K5 (which is the same situation as described with reference to FIG. 2). The imaginary carry signal $CC_{15}$ is further applied to the selection switches K6b and K6a. Depending on whether the signal $CC_{15}$ has the logic values "0" or "1", the selection switch K6a or K6b respectively applies the respective imaginary carry signals $CC_{18'}$ or $CC_{18}$ and $CC_{18}$ or $CC_{18'}$ to the respective inputs $a_6$ and $b_6$ of the selection circuit K6. The signal $CC_{18}$ or $CC_{18'}$ at the input $b_6$ of selection circuit K6 also controls the selection switches K7a and K7b, which receive the imaginary signals $CC_{21}$ and $CC_{21'}$ at their inputs. Depending on whether the logic value "0" or "1" is present at the input $b_6$ the selection switch K7a or K7b, respectively applies the respective imaginary carry signals $CC_{21'}$ or $CC_{21}$ and $CC_{21}$ or $CC_{21'}$ to the respective inputs $a_7$ and $b_7$ of the selection circuit K7. The signal $CC_{21}$ or $CC_{21'}$ at the input $b_7$ controls in the same way as described above the selection switches K8a and K8b. From the foregoing it follows that the imaginary carry signals $CC_{24}$ and $CC_{24'}$ are available at the inputs $a_8$ and $b_8$ of the selection circuit K8 after $1 \times \tau_c + 3 \times \tau_s = 53$ nsec.; so that the carry signal $C_{24}$ is already available after 65 nsec. So the full adder circuit shown in FIG. 2 can be operated faster when the sub-circuit SU2' of FIG. 3 is used in FIG. 2 and the carry signal $C_{12}$ is generated more quickly, (15 nsec. more quickly). This faster generation of carry signal $C_{12}$ can be accomplished by using in FIG. 2 the full adder circuit 1 of FIG. 1, instead of sub-circuit SU1, a logic value "0" being applied to the carry signal input for the signal $C_0$. The carry signal $C_{12}$ is then already available in FIG. 1 after $\simeq 1 \times \tau_c + 3 \times \tau_s = 53$ nsec. (as the selection circuit S1 is always in the same position).

Figure 4:
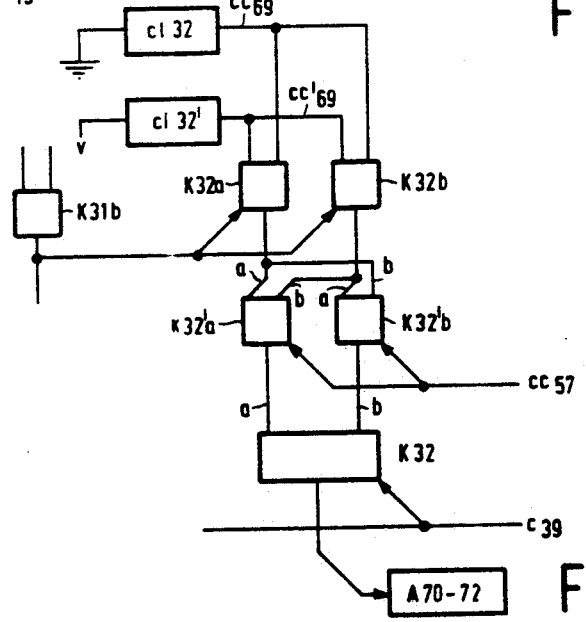
FIG. 4 shows a detail of a fourth embodiment of a portion of a full adder circuit according to the invention.

It should be noted that the sub-circuit SU3 of FIG. 2 can also be replaced by a similar circuit as shown in FIG. 3 which again results in some gain in time for generating the sum signals $S_{36}$ to $S_{39}$. In addition, it should be noted that for assembling still larger binary numbers (for example 80 bits and more) it is advisable to introduce a third multiplexed level (32'a, K32'b form the second level, K32a, b form the first level) between the look-ahead sub-circuits cl i (see FIG. 4, i=32) and the full adders (A70-72). The third level (K32) is controlled by the carry signal $C_{39}$ generated in the sub-circuit SU3 (FIG. 2) so that all of the carry signals of a higher significance (higher than 40) are already available after a single delay $\tau_s$ (12 nsec.). This makes it possible to add together, for example, two 80 bit numbers in approximately 150 nsec. For the sake of clarity it should be noted that then two further (third and fourth) selection switches K32'a, b must be provided in each selection circuit (K32 as shown in FIG. 4), the a-input and b-input, respectively of the selection circuit K32 being connected to the outputs of the selection switches (K32'a, b) and the a-input and b-input, respectively of the third and fourth selection switches (K32'a, b) being connected to the outputs of the respective selection switches K32a, K32b and K32b, K32a. In the example illustrated by FIG. 4 the starting point is the situation in which the sub-circuits SU1, SU2, SU3, SU4 and SU5 (not shown) have respective "widths" of 12, 12, 15, 18, and 21 bits, so that the carry signal $C_{39}$ (12+12+15) generated in sub-circuit SU3 controls the third multiplex level (K32) of the sub-circuits SU4 and SU5 and the imaginary carry signal $CC_{57}$ (12+12+15+18) generated in sub-circuit SU4 controls the second level (k32'a, b) in the sub-circuit SU5, the signal $CC_{57}$ being obtained from the b-input of the selection circuit K19 of the sub-circuit SU4 (the carry signal immediately above the 3rd level).

The circuits described in the foregoing are formed from full adders, carry look-ahead circuits and multiplex circuits (always choice 1 out of 2), which are all circuits which are known *per se* and are preferably integrated on a semiconductor substrate, the full adder circuit forming part of a more extensive circuit (multipliers, etc.).

What is claimed is:

1. A full adder circuit for adding two n-bit binary numbers comprising: a plurality of cascaded sub-circuits of a first type having a plurality of bit inputs for receiving groups of bit signals having a significance progressing from m to k wherein $m < k \leq n$, each sub-circuit of a first type comprising two sub-circuits of a second type and a selection circuit, first and second sub-circuits of the second type respectively receiving the respective logic values "0" and "1" at a carry signal input and generating at a carry signal output an imaginary carry signal having a significance k+1, the carry signal outputs being connected to inputs of the selection circuit, a further input of the selection circuit being connected to an output of a preceding sub-circuit of the first type or to a sub-circuit of the second type arranged in cascade with the sub-circuit of the first type, at which output a carry signal having a first significance (m) is generated for selecting by means of the selection circuit a carry signal having a higher significance (k+1) from the generated imaginary carry signals and for applying the selected carry signal to a carry signal output of the sub-circuit of the first type, characterized in that the sub-circuits of the second type are carry look-ahead circuits, outputs of which are connected to the carry signal input of the selection circuit whose further input is connected to the carry signal input of a single full adder for adding together two bits of the significance m.

2. A full adder circuit as claimed in claim 1, characterized in that a carry look-ahead circuit comprises at least two look-ahead units, consecutive look-ahead units receiving significance-sequential sub-groups (m to 1, 1 to k) from a group of bit signals (wherein $m < 1 \leq k$) for generating imaginary carry signals with progressing significances, the selection means comprising a selection circuit for every two look-ahead units producing imaginary carry signals with the same significance, carry signal inputs of said selection circuit being connected to the outputs of the last-mentioned two look-ahead units and an output of said selection circuit being connected to an input of a full adder for adding together two bits having (the same) associated significance, a carry signal of a first significance generated in a preceding sub-circuit of the first type or in a sub-circuit of the second type being applied to a control input of each selection circuit in a sub-circuit of the first type for selecting a carry signal from the two imaginary carry signals applied to the selection circuit.

3. A full adder circuit as claimed in claim 2, characterized in that in a sub-circuit of the second type the look-ahead sub-circuits are arranged in cascade.

4. A full adder circuit as claimed in claim 2, characterized in that in a sub-circuit of the first type the input of each of respective first and second look-ahead sub-circuits which generate an imaginary carry signal of the same significance, receives the logic values "0" and "1", respectively, outputs of the two look-ahead sub-circuits generating an imaginary carry signal of the same significance being connected to inputs of first and second selection switches having outputs connected to the carry signal inputs of the selection circuit, and means connecting control inputs of the first and second selection switches, respectively, for choosing from the two imaginary carry signals applied thereto, to respective first and second carry signal inputs of the selection circuit associated with the two preceding look-ahead sub-circuits.

5. A full adder circuit as claimed in claim 4, characterized in that the sub-circuits of the first type are divided into groups, a carry signal of the highest significance generated from a first group of sub-signals being used as a control signal for the selection circuits in the sub-circuits of a second group for choosing the carry signals of a higher significance from the imaginary carry signals, there being arranged between each selection circuit and the two selection switches third and fourth selection switches whose outputs are connected to the inputs of the selection circuit and a first and a second input of the third and fourth selection switches, respectively being connected to the respective outputs of the first and second selection switches and to the outputs of the second and first selection switches, the control inputs of the third and fourth selection switches in a sub-circuit of the first type being connected to an input of a selection circuit of a preceding sub-circuit of the first type which is arranged in cascade with the sub-circuit of the first type, imaginary carry signals of the highest significance prevailing in the sub-circuit of the first type being applied to said selection circuit.

6. A full adder circuit as claimed in any one of claims 1 to 5 integrated on a semiconductor substrate.

* * * * *